United States Patent [19]

Piesch et al.

[11] 4,328,326
[45] May 4, 1982

[54] MELAMINE RESINS: PROCESS FOR THEIR MANUFACTURE AND THE COMPRESSION MOULDING COMPOSITIONS PRODUCED FROM THE MELAMINE RESINS

[75] Inventors: Steffen Piesch, Oberursel; Alfons Wolf, Seligenstadt, both of Fed. Rep. of Germany

[73] Assignee: Cassella Aktiengesellschaft, Frankfurt, Fed. Rep. of Germany

[21] Appl. No.: 223,932

[22] Filed: Jan. 9, 1981

Related U.S. Application Data

[62] Division of Ser. No. 42,976, May 29, 1979, Pat. No. 4,303,561.

[30] Foreign Application Priority Data

Jun. 3, 1978 [DE] Fed. Rep. of Germany ....... 2824473

[51] Int. Cl.³ .................. C08G 8/36; C08G 61/32
[52] U.S. Cl. .................................. 525/509; 525/517; 524/597
[58] Field of Search ........................................ 525/509

[56] References Cited

U.S. PATENT DOCUMENTS 3,959,201  5/1976  Chang et al. ................ 525/509
4,163,835  8/1979  Piesch ......................... 528/254

*Primary Examiner*—J. Ziegler
*Attorney, Agent, or Firm*—Connolly and Hutz

[57] ABSTRACT

Partially etherified melamine-formaldehyde resins having a melamine:formaldehyde molar ratio of 1:(1.25 to 1) can be prepared by a condensation reaction under neutral or weakly alkaline conditions if the condensation reaction is carried out in the presence of a glycol monoether of the general formula I $$R(OCH_2 CH_2)_n OH \qquad (I)$$

wherein R denotes alkyl having 1 to 4 C atoms and n denotes a number from 1 to 5. The partially etherified melamine-formaldehyde resins are suitable for the production of compression moulding compositions having a high flow and minimal processing shrinkage and after-shrinkage.

2 Claims, No Drawings

MELAMINE RESINS: PROCESS FOR THEIR MANUFACTURE AND THE COMPRESSION MOULDING COMPOSITIONS PRODUCED FROM THE MELAMINE RESINS

This application is a division of application Ser. No. 42,976 filed May 29, 1979, U.S. Pat. No. 4,303,561.

The invention relates to partially etherified melamine resins which have a melamine:formaldehyde molar ratio of 1:(1.25 to 1.0) and which, after being processed to give moulding compositions, exhibit virtually no processing shrinkage and after-shrinkage, and to a process for the manufacture of the partially etherified melamine resins and to the compression moulding compositions produced from the melamine resins.

Mouldings of the most diverse kinds, such as, for example, kitchen crockery, trays, casings for telephones, radios, clocks and television sets, buttons, fittings, insulated electrical components and the like are manufactured from plastic compression moulding compositions. In manufacturing fairly large plastic mouldings it is necessary to maintain low values for processing shrinkage and after-shrinkage, in order to make it possible for the mouldings to be satisfactorily processed and to prevent subsequent fracture in the mouldings. Such requirements are fulfilled, for example, by phenolic resin compression moulding compositions, but above all by polyester resin and epoxide resin compression moulding compositions. Some of these resins are expensive and some of the mouldings produced therefrom still have undesirable thermoplastic properties or are insufficiently resistant to solvents or heat. Mouldings which are used in the electrical industry, such as, for example, switches, knobs, fuse holders, base frame components, holders for transistors, integrated circuits and the like must, in addition, be made creep resistant to an adequate extent.

Melamine resin moulded materials exhibit greater values of after-shrinkage than do, for example, phenolic resin compression moulding compositions and, above all, polyester resin and epoxy resin compression moulding compositions. This after-shrinkage of customary melamine resin pressings only allows them to be used in cases where the tolerances are large and the degree of warming is small. The after-shrinkage can be reduced by using high proportions of special inorganic fillers, for example aluminium hydroxide (compare German Document open for inspection No. 2,356,298), ground minerals and the like, but it is then necessary in most cases to accept poorer flow properties when the melamine resin compression moulding compositions are being processed.

German Documents open for inspection 2,603,767 and 2,603,768 disclose electrolyte-free melamine resins which give compression mouldings having a high electrical resistance and a high electrical creep resistance. However, the processing shrinkage and after-shrinkage of the compression moulding compositions produced with these known melamine resins is still too great for the manufacture of fairly large mouldings.

It has now been found, surprisingly, that melamine/-formaldehyde resins in which less than 1.3 mols of formaldehyde are present per mol of melamine exhibit only minimal values of processing shrinkage and after-shrinkage when being processed to give compression moulding compositions or moulding compositions, regardless of the filler used. The melamine:formaldehyde molar ratio in the resins according to the invention is 1:(1.25 to 1), preferably 1:(1.20 to 1.12). Melamine/formaldehyde condensation products in which less than 1.3 mols of formaldehyde are present per mol of melamine have, however, hitherto not been accessible in the customary alkaline or neutral condensation reaction. The melamine/formaldehyde resins according to the invention can, however, be prepared in a simple manner if the condensation reaction is carried out in the presence of a glycol monoether of the general formula I

$$R(OCH_2CH_2)_nOH \qquad (I)$$

wherein R denotes alkyl having 1 to 4 C atoms and n denotes an integer from 1 to 5, as a solvent and etherifying agent, and in the presence of a small quantity of an electrolyte such that an approximately neutral to weakly alkaline pH value, preferably a pH value of 7.2 to 8.5, is set up in the condensation reaction. The resulting resins are partially etherified and can be prepared in a high concentration and with a high viscosity, which facilitates their processability to give compression moulding compositions.

The formaldehyde is normally employed in the form of the conventional 39% strength aqueous solution. However, paraformaldehyde or more highly concentrated formaldehyde solutions or solutions of formaldehyde in the glycol monoethers of the formula I can also be employed. 1 to 6 mols of glycol monoether of the formula I are used, relative to one mol of the formaldehyde used. An excess of glycol monoether can be removed by distillation, appropriately under reduced pressure, after the condensation reaction is complete. 0.05 to 0.8% by weight, relative to the solids content of the finished resin, are normally required of the electrolyte which sets up an approximately neutral to weakly alkaline pH value, preferably a pH value of 7.2 to 8.5, in the condensation reaction. Examples of suitable electrolytes are alkali metal hydroxides or carbonates, such as, for example, sodium or potassium hydroxide or potassium or sodium carbonate, or amino-alcohols, preferably tertiary amino-alcohols, such as, for example, aminoethanol, 3-aminopropanol, N-methylaminoethanol, N-ethylaminoethanol, N,N-dimethylaminoethanol, N,N-diethylaminoethanol, N,N-dipropylaminoethanol, N,N-dimethylaminopropanol, N,N-diethylaminopropanol or N,N-dipropylaminopropanol. It is also possible to employ mixtures of different suitable electrolytes. In using the preferred tertiary amino-alcohols, it is normally sufficient to add 0.1 to 0.5% by weight, relative to the solids content of the finished resin. The condensation reaction is carried out at temperatures of 50° to 150° C., preferably 80° to 120° C., appropriately while stirring, until the desired degree of condensation has been achieved. The degree of condensation is measured in the customary manner by determining the dilutability with water. A measured volume of resin is titrated with water at 20° C. until a permanent turbidity is formed. A 1:0.5 figure of dilutability with water thus means that a permanent turbidity is formed on mixing 1 part by volume of resin with 0.5 part by volume of water.

As a rule, the condensation reaction is continued until a dilutability with water of 1:0.5 to 1:2.5, preferably 1:0.5 to 1:1.1 has been achieved. The water introduced and the water of reaction formed are then removed by distillation under reduced pressure, as a rule in a water-pump vacuum of approx. 10 to 100 mbars, and excess glycol monoether of the formula I may also pass over at the same time. Depending on the temperatures used in the condensation reaction, part of the water already distils off during the condensation reaction.

Examples of glycol monoethers of the general formula I which can be used for the manufacture of the partially etherified resins according to the invention are methylglycol, ethylglycol, diglycol monomethyl ether, diglycol monoethyl ether, diglycol monopropyl ether, triglycol monomethyl ether, triglycol monoethyl ether, triglycol monopropyl ether, triglycol monobutyl ether, tetraglycol monomethyl ether, tetraglycol monoethyl ether, tetraglycol monopropyl ether, tetraglycol monobutyl ether or pentaglycol monomethyl, monoethyl, monopropyl or monobutyl ethers. It is also possible to use mixtures of different glycol monoethers of the general formula I.

In order to improve, for example, the impact strength of the mouldings, it can be appropriate to add, when preparing the resin, before or during the condensation reaction, up to 5% by weight, relative to the total solids content of the finished resin, of a crosslinking agent of the general formula II

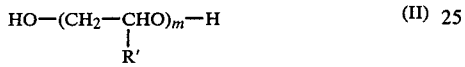

wherein R′ can be —CH$_3$ or —CH$_2$OH and m can be an integer from 1 to 4. The following are examples of such crosslinking agents: glycol, ethylene diglycol, ethylene triglycol, ethylene tetraglycol, propylene glycol, dipropylene glycol, tripropylene glycol, tetrapropylene glycol, glycerol or polyglycerol.

The method described makes it possible to prepare resins according to the invention having a melamine:-formaldehyde molar ratio of 1:(1.25 to 1.12). The preparation of resins with a melamine:formaldehyde molar ratio of 1:(1.12 to 1.0) requires the addition of ethyleneurea or propyleneurea in order to absorb the excess formaldehyde present in the condensation batch, that is to say the proportion of formaldehyde exceeding the molar ratio of 1:1.12.

The resins according to the invention have little odour, the lack of odour decreasing as the formaldehyde content falls. Resins with a melamine:formaldehyde molar ratio of 1:(1.12 to 1.0) are also free from odour when processed further.

The resins according to the invention can be processed in a manner which is in itself known to give compression moulding compositions. The manufacture and processing of compression moulding compositions is described, for example, in Ullmann's Encyclopädie der techn. Chemie ("Encyclopaedia of Industrial Chemistry"), 3rd edition, Volume 14 (1963), pages 364–374 and in Bachmann-Bertz: "Aminoplaste" ("Aminoplasts") (1967), pages 93–122. In the manufacture of the compression moulding compositions, the resin, together with a filler and further additives, such as, for example, dyestuffs, flow auxiliaries, lubricants and release agents, curing agents or curing accelerators, is mixed, kneaded, dried, comminuted or granulated and dyed; the individual processing stages normally cannot be sharply separated from one another, since several processes take place during a single operation. Examples of known fillers are wood flour, cellulose, cellulose ester powders, ground minerals, glass powder, glass fibres, cotton flock, flour, starch, peat, asbestos fibres, graphite, mica flakes, linters, hemp, synthetic fibres, chalk, lime, gypsum, fireclay, metal dust, such as, for example, copper powder, and the like, of which wood flour and cellulose are preferred.

Examples of curing agents or curing accelerators which are in themselves known are acids or compounds which split off acid. By selecting suitable curing agents or curing accelerators it is possible to adjust the curing rate of the compression moulding compositions to a desirable figure, without their melt viscosity being appreciably increased. Examples of suitable curing agents are succinic anhydride, phthalic anhydride, maleic anhydride, benzenetetracarboxylic acid anhydride and polyphosphoric acid esters, but preferably the system formic acid:hydrogen peroxide. In this, the formic acid is generally 85% strength by weight and the hydrogen peroxide 30% strength by weight and the ratio of formic acid to hydrogen peroxide is normally 1:0.75 parts by weight. The formic acid/hydrogen peroxide curing agent, which leaves no residues after curing, is used in a quantity not higher than 2% by weight, preferably 0.5 to 1.5% by weight, relative to the total weight of the compression moulding composition. If other curing agents are used, it may be necessary to use higher quantities.

Known flow auxiliaries are sorbitol, glycols and glycol derivatives and polyglycols. The lubricants or release agents employed, which are necessary for the satisfactory removal of the moulding from the mould, are metal stearates, preferably zinc stearate, calcium stearate and magnesium stearate.

Organic and inorganic pigments and soluble dyestuffs can be used for colouring. Suitable inorganic pigments are, in general, based on sulphides, oxides or mixed oxides of metals, especially titanium, zinc, iron, chromium, cobalt, lead and cadmium. Carbon black is a preferred black pigment. The compounds characterised as pigment dyes in the Colour Index the suitable as organic pigments. The additives must be selected according to the purpose desired.

Thus, for example, high contents of graphite and carbon black increase the electrical conductivity. Special properties can be achieved by means of further additives which are in themselves known, such as, for example, fluorescent substances.

The ratio of resin to filler is determined, as is known, by the nature and structure of the filler. In the manufacture of known compression moulding compositions the resin/filler ratio varies between 25:75 and 70:30, that is to say 0.43 to 3 parts by weight of filler are mixed into 1 part by weight of resin. This resin/filler ratio is also used when manufacturing compression moulding compositions using the resins according to the invention.

The melamine-formaldehyde resins according to the invention are mixed with the filler and the other additives in known mixing units, such as, for example, mixing rolls, mixing screws, kneaders and screw kneaders, appropriately at temperatures between 70° and 140° C., preferably 105° to 120° C. Kneading at elevated temperatures gives substantial advantages in respect of the energy required for kneading and the homogeneity of the mixture which can be achieved. After mixing, the resulting mixture is cooled to room temperature, and it generally solidifies. The solid product is then comminuted or granulated in the customary manner and can then be processed in a manner which is in itself known by compression moulding, transfer moulding or extrusion to give compression mouldings. Compression moulding is generally carried out at temperatures between 120° to 180° C., preferably 140° and 170° C., under pressures of 150 to 800 bars, preferably 200 to 500 bars. The moulding cycle is generally 30 seconds to 5 minutes. Compression moulding compositions produced with the resins according to the invention exhibit high flow and minimal processing shrinkage and after-shrinkage. For resins with a melamine:formaldehyde molar ratio of 1:(1.20 to 1) the values for processing shrinkage and after-shrinkage are even reduced virtually to zero. Compression moulding compositions produced with the resins according to the invention have a greater latitude in processing than conventional melamine compression moulding resins, by virtue of their lower reactivity, their freedom from shrinkage and their stability against cracking. They cure without colour and remain free from yellowing even when exposed to heat and thus can be coloured without any limit. The resins can be used, for example, as shrinkage-free, creep resistant insulating materials which can be coloured according to choice, in compression moulding compositions for plates and dishes and drinking vessels, in the automobile industry, for example brake and clutch linings, and for the manufacture of dimensionally stable mouldings of all kinds.

In the examples which follow, unless otherwise specified, parts are parts by weight and percentages are percentages by weight; the temperatures are quoted in degrees centigrade.

EXAMPLE 1

7.5 kg of aqueous 39% strength formaldehyde solution, 7.5 kg of water, 40 g of dimethylaminoethanol, 10.4 kg of melamine and 9.4 kg of ethylpolyglycol (a mixture consisting of approx. 70% of ethyldiglycol, 20% of ethyltriglycol and 10% of ethyltetraglycol) are stirred at 100° C. until a dilutability with water of 1:1.0 has been reached. The water added and the water of reaction formed are now removed by distillation in a waterpump vacuum (altogether approx. 12.7 kg). This gives 22 kg of a virtually 100% strength compression moulding resin of high viscosity, which can still be diluted with water in a ratio of 1:2. The melamine/C-$H_2O$/ethylpolyglycol molar ratio is 1:1.18:0.8.

EXAMPLE 2

600 g of aqueous 39% strength formaldehyde solution, 5 g of dimethylaminoethanol, 700 g of water, 700 ml of methyldiglycol, 50 g of diglycol (as a crosslinking agent) and 810 g of melamine are subjected to a condensation reaction, while stirring, at 110° C. for approx. 3 hours until a dilutability with water of 1:1.0 is reached. Approx. 700 ml of water are then removed by distillation in a waterpump vacuum. The resulting resin is 71% strength and its melamine:formaldehyde molar ratio is 1:1.21; the properties of a moulding produced with the resin are quoted in the table.

EXAMPLE 3

923 g of aqueous 39% strength formaldehyde solution, 1,020 g of water, 660 g of ethylpolyglycol of the composition indicated in Example 1, 6 g of dimethylaminoethanol, 120 g of diglycol and 1,260 g of melamine are subjected to a condensation reaction, while stirring, at a bath temperature of 120° C. until a dilutability with water of 1:1.0 is reached. Approx. 1,100 g of water are then removed by distillation in a waterpump vacuum. The resulting resin is approx. 60% strength and its melamine:formaldehyde molar ratio is 1:1.20. The properties of a moulding produced with the resin are quoted in the table which follows.

EXAMPLE 4

360 g of aqueous 39% strength formaldehyde solution, 2 g of dimethylaminoethanol, 360 g of water, 500 g of melamine and 450 g of ethyltriglycol are subjected to a condensation reaction at 100° C. until a dilutability with water of 1:0.5 is reached, and 300 ml of water are then removed by distillation in a waterpump vacuum. The end product has a dilutability with water of 1:1.2. The properties of the mouldings obtained with this resin are quoted in the table which follows.

EXAMPLE 5

1,800 g of aqueous 39% strength formaldehyde solution, 2,100 g of water, 1,650 g of methyldiglycol, 10 g of dimethylaminoethanol and 2,400 g of melamine (melamine:formaldehyde = 1:1.23) are subjected to a condensation reaction at 100° C. until a dilutability with water of 1:1.0 is reached. Approx. 1,950 ml of water are removed by distillation in a waterpump vacuum. The dilutability with water of the resulting resin is 1:2.7. The properties of a moulding obtained with this resin are quoted in the table which follows.

EXAMPLE 6

720 g of aqueous 39% strength formaldehyde solution, 1 g of $K_2CO_3$, 1,000 g of melamine, 600 g of water and 1,000 g of ethylpolyglycol of the composition quoted in Example 1 are subjected to a condensation reaction at 102° C. for approx. 12 hours, while stirring, until a dilutability with water of 1:1.1 is reached, and approx. 520 g of water are then removed by distillation at an internal temperature of 50° C. and a pressure of 56.5 mbars. The resulting resin is 62% strength and has a melamine:formaldehyde molar ratio of 1:1.179. The properties of a moulding produced with the resin are quoted in the table which follows.

The content of the resins was calculated from the loss in weight undergone by a sample heated at 120° C. for 1 hour at a pressure of 13.3 mbars.

EXAMPLE 7 (COMPARISON EXAMPLE)

700 g of aqueous 39% strength formaldehyde solution, 700 g of water, 400 g of methyldiglycol, 5 g of dimethylaminoethanol and 810 g of melamine (melamine:formaldehyde = 1:1.41) are subjectedto a condensation reaction at 100° C. until a dilutability with water of 1:1.0 is reached and water is then removed by distillation in a waterpump vacuum. This gives 1,800 g of a 75% strength resin which has a dilutability with water of 1:2.0. The properties of a moulding obtained with this resin are quoted in the table which follows.

EXAMPLE 8

440 g of aqueous 39% strength formaldehyde solution, 500 g of water, 350 g of methyldiglycol, 3 g of dimethylaminoethanol, 40 g of diglycol and 600 g of melamine are stirred at 100° C. for approx. 3 hours until a dilutability with water of 1:1 is reached. Approx. 400 ml of water are then removed by distillation in a waterpump vacuum and 45 g of ethyleneurea are then stirred in at 50° C. The resulting resin is 82% strength, it has a melamine:formaldehyde molar ratio of 1:1 and can be diluted without limit with methyldiglycol. No formaldehyde is liberated if the resin is subjected by heat, and under acid catalysis, to a condensation reaction to completion, that is to say the condensation product is also free from odour under processing conditions.

In order to determine the processing shrinkage and after-shrinkage in accordance with DIN 53,464 and creep resistance in accordance with DIN 53,480, compression moulding compositions of type 152 according to DIN 7708 were prepared as follows:

70 parts of resin, 30 parts of cellulose, 1 part of zinc stearate and 1 part of curing agent of the system mentioned in the description: 85% strength formic acid and 30% strength hydrogen peroxide in a ratio of 1:0.75, are milled at 110° C. on a roller mill to give a milled hide. After the milled hide has been granulated, a moulding is prepared in the form of a standard bar at 150° to 155° C., 250 bars and a moulding cycle of 8 minutes. The results obtained on the mouldings produced are listed in the following table:

TABLE

| Compression moulding composition of type 152 according to DIN 7,708 | Melamine: formaldehyde molar ratio of the resin | Shrinkage according to DIN 53,464 | | Creep resistance according to DIN 53,480 |
|---|---|---|---|---|
| | | Processing shrinkage % | After-shrinkage % | |
| Commercially available melamine resin | 1:2.6 | 0.46 | 1.1 | KA3c |
| Commercially available melamine resin | 1:1.8 | 0.4 | 1.0 | KA3c |
| Commercially available melamine resin | 1:1.65 | 0.4 | 0.9 | KA3c |
| Example 7 | 1:1.41 | 0.38 | 0.85 | KA3b |
| Example 5 | 1:1.23 | 0.25 | 0.5 | KA3c |
| Example 2 | 1:1.21 | 0.25 | 0.45 | KA3c |
| Example 3 | 1:1.20 | 0 | 0 | KA3c |
| Example 1 | 1:1.18 | 0 | 0 | KA3c |
| Example 4 | 1:1.18 | 0 | 0.05 | KA3b |
| Example 6 | 1:1.18 | 0 | 0 | KA3c |

The compression moulding compositions prepared with the resins according to the invention in other respects meet the other requirements set for compression moulding compositions in the DIN specifications.

We claim:

1. Partially etherified melamine-formaldehyde resin having a melamine:formaldehyde molar ratio of 1:(1.25 to 1) and containing relative to its solids content, a cross-linking amount but no more than 5% by weight of a glycol of the formula $$HO-(CH_2-CHO)_m-H$$
$$\phantom{HO-(CH_2-C}|$$
$$\phantom{HO-(CH_2-CHO)_m}R'$$

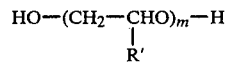

wherein R' is —CH$_3$ or —CH$_2$OH and m denotes an integer from 1 to 4.

2. Partially etherfied melamine-formaldehyde resin according to claim 1 wherein the melamine:formaldehyde molar ratio is 1:(1.12 to 1).

* * * * *